No. 845,113. PATENTED FEB. 26, 1907.
C. A. NOREN.
AUTOMATIC SAFETY DEVICE.
APPLICATION FILED APR. 17, 1906.
3 SHEETS—SHEET 1.
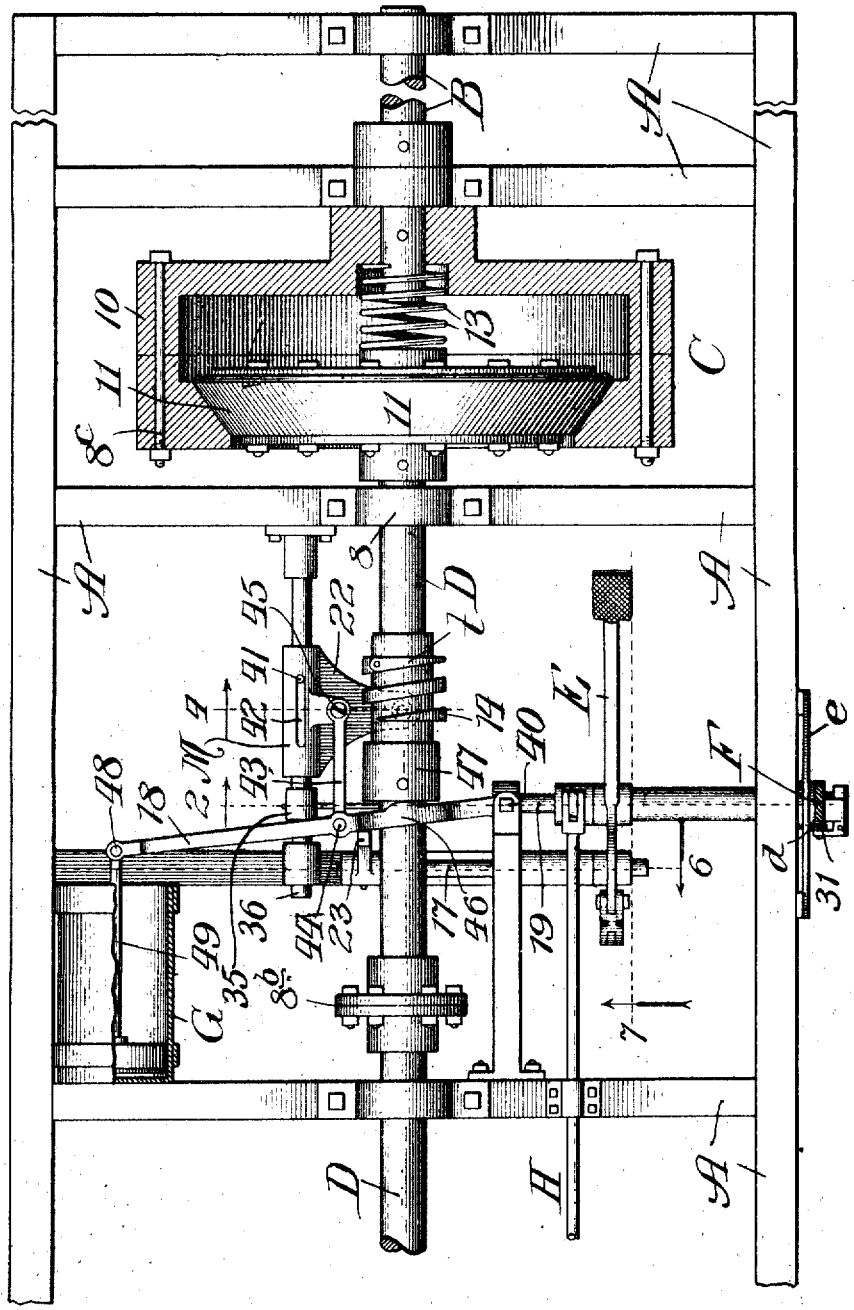
Witnesses:
Inventor:
Charles A. Noren,
By Robert Catherwood
Atty

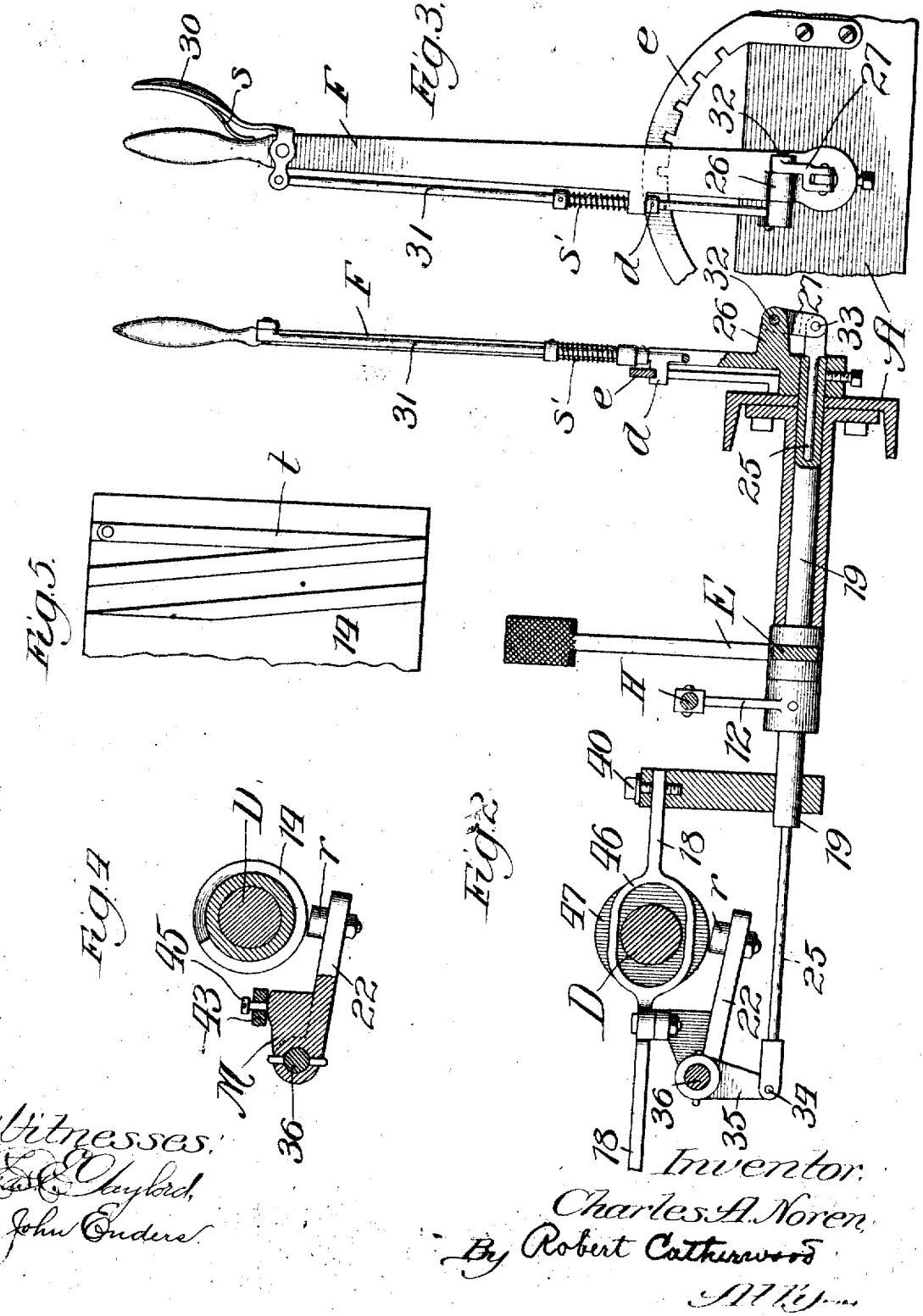

No. 845,113. PATENTED FEB. 26, 1907.
C. A. NOREN.
AUTOMATIC SAFETY DEVICE.
APPLICATION FILED APR. 17, 1906.
3 SHEETS—SHEET 3.
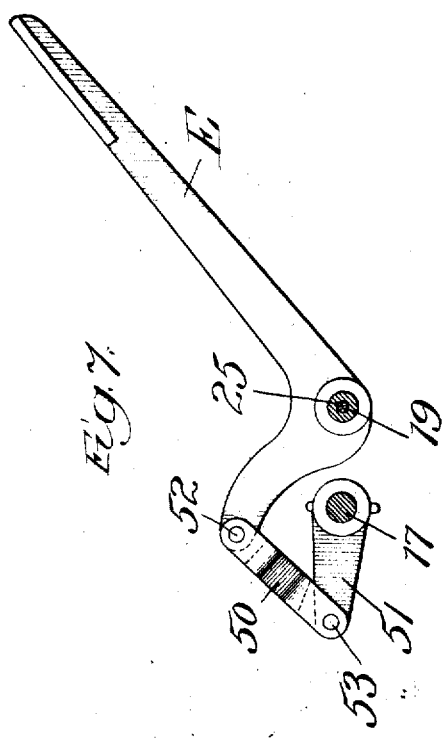
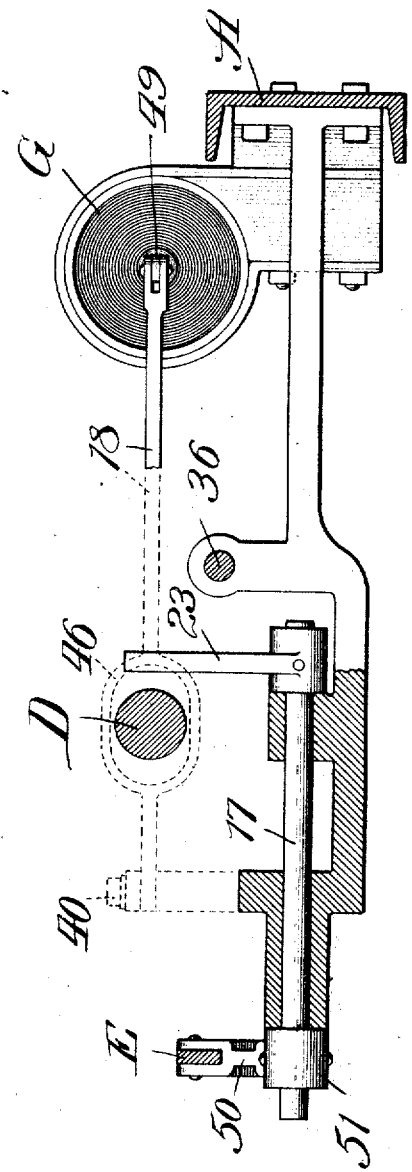
Witnesses:
Inventor:
Charles A. Noren,
By Robert Catherwood
Atty

UNITED STATES PATENT OFFICE.

CHARLES A. NOREN, OF CHICAGO, ILLINOIS.

AUTOMATIC SAFETY DEVICE.

No. 845,113.      Specification of Letters Patent.      Patented Feb. 26, 1907.

Application filed April 17, 1906. Serial No. 312,281.

*To all whom it may concern:*

Be it known that I, CHARLES A. NOREN, a citizen of the United States, residing at Chicago, in the county of Cook and State of Illinois, have invented certain new and useful Improvements in Automatic Safety-Devices, of which the following is a specification, reference being had therein to the accompanying drawings.

My invention relates to an automatic safety device for operating the transmission-clutch and the gear-shifting connections of automobiles.

The object of my invention is to provide a simple, durable, and economical device of this character which will automatically unlock the clutch whenever the gears are changed, and which operates the clutch either with or without changing gears without jerking or suddenly wrenching the power and gear-driving shafts, and thereby injuring attached parts, stripping the gears, and violently or suddenly starting the car.

While my invention is especially adapted for use on automobiles, it may be used to advantage on other machines to control clutches and similar mechanism serving the same general purpose.

To illustrate my invention, I have shown in the accompanying drawings its preferred form adapted for use on an automobile.

Figure 1 is a skeleton broken plan view of the forward portion of an automobile showing the well-known form of clutch in section, the usual power and slidable gear-driving shafts, the gear-shifting connections or rod H, which operate gear-changing mechanism, and a broken plan view of my device attached thereto. Fig. 2 is an enlarged transverse sectional elevation taken on line 2 of Fig. 1. Fig. 3 is a broken side elevation of an operating hand-lever, showing a spring-rod, catch, and ratchet for locking the lever in desired position, and one of a series of connections which tie the gear-shift and clutch-unlocking mechanism together. Fig. 4 is an enlarged transverse sectional view taken on line 4 of Fig. 1 showing my preferred form of compound worm and collar mounted on the slidable gear-drive shaft D and the rocking and engaging member M, operated by the gear-shift lever to unlock the clutch automatically whenever changing gears. Fig. 5 is a developed view of my preferred form of compound worm and collar. Fig. 6 is an end transverse sectional view taken on line 6 of Fig. 1, and Fig. 7 is an enlarged sectional elevation taken on line 7 of Fig. 1 showing a foot-lever and my preferred means for operatively attaching the clutch-controlling rock-lever 17 thereto.

In the drawings, A is a supporting-frame, B a power-shaft, C a friction-clutch, the flywheel or main member 10 of which is made in separable halves and keyed or otherwise secured to rotate with shaft B.

D is a longitudinally-slidable gear-driving shaft to which is keyed or otherwise secured to rotate therewith the interior or inner cone member 11 of clutch C. For convenience in removing the section of the shaft D, to which my device is best attached, I prefer to provide removable journal-cap 8, shaft-union 8ᵇ, and removably secure the halves of member 10 by the bolts 8ᶜ. By this construction the forward portion of the shaft D may be attached at the union, when by removing cap 8, bolts 8ᶜ, one-half of the fly-wheel 10, and unpinning the ends 40 and 48 of lever 18, hereinafter described, the clutch member 11, the lever 18, and a section of shaft D may be taken out.

E indicates the foot-lever loosely mounted upon and turning freely on shaft 19 and adapted to operate clutch-unlocking mechanism, hereinafter described, without disturbing the gear-shift.

F indicates the hand-lever, which operates shaft 19 to rock arm 12 and shift gear mechanism (not shown) by means of the gear-shifting-connection or rod H.

While I have shown in the drawings a friction-clutch C wherein the inner member is pinned to shaft D within the hollow flywheel member 10, which in turn is pinned to shaft B and having inclined surfaces against which the segmental cone surfaces of the inner member 10 normally engage by reason of the tension exerted by spring 13, surrounding the end of shaft B and bearing against the recess in the fly-wheel 10 and the axle of member 11, and thereby tending normally to frictionally lock the two members together, it will readily be seen that my device may be adapted to other clutches, and the modifications necessary for such adaptation will readily suggest themselves to persons skilled in the art.

The shaft D or the removable portion thereof is provided with a spiral or worm 14, having on the right-hand spiral, as shown in Fig. 1, a pivoted tongue or gate *t*, adapted to be pressed out to complete the spiral and to be forced back by roller r to form a collar-surface, the part 14 being by reason of this tongue or gate a compound worm and collar. The pitch of the spirals and their number is sufficient to advance shaft D far enough to free the inner clutch member 11 from the outer clutch member 10, and the position of the tongue t and the last spiral, which forms a collar-surface, is determined by the position of the collar 47, hereinafter described. The relative position of these parts is such that when the roller r is turning on the collar t and the last spiral of worm 14 the lever 18, hereinafter described, is pressed closely against the collar 47.

On rocking shaft 36, held in suitable bearings against longitudinal movement therein, is mounted a tilting and slidable member M, having an arm 22, on the outer end of which is roller r, adapted when member M is tilted or turned upward to enter the spirals of worm 14, draw lever 18 by means of link 43 forward on its fulcrum 40 against collar 47, (on the surface of which loop 46 turns, so as to afford a point bearing,) retract spring 13, and disengage members 10 and 11 of clutch C, and hold the members in this unlocked position by means of the collar formed on worm 14 by the swinging tongue t until rocking shaft 36 is turned downward to free roller r from the worm and collar 14. A pin 41 on rock-shaft 36 and a slot 42 in member M allows the latter longitudinal movement independent of rock-shaft 36, and also a limited up-and-down tilting movement sufficient to allow roller r alternately to clear and engage the spirals of worm 14.

Pivoted at one end at the point 40 to a suitable support is the cross-lever 18, to which member M is connected by link 43, loosely pinned to lever 18 at 44 and to M at 45, so as to permit member M a limited tilting play sufficient to allow roller r to be rocked in and out of engagement with the spirals of worm 14. When lever 18 is moved on the point 40 as a fulcrum, it will force member M to slide upon rock-shaft 36. A loop 46, Fig. 2, in lever 18 embraces shaft D, on which is secured a contacting or collar surface 47. I prefer to provide the surface of loop 46 adjacent to collar 47 with a curved pointed bearing, as shown in Fig. 1. To the end 48 of lever 18 is pivoted piston 49 in dash-pot G. This dash-pot connection with the lever 18 is adapted to elastically cushion or yieldingly resist the action of spring 13 as the clutch members are interlocked.

The clutch C may be operated by foot-lever E or hand-lever F. Foot-lever E, adapted to turn freely on shaft 19 as a fulcrum, is connected to rock-shaft 17, which it throws or rocks by means of a link 50, Fig. 7, and an arm 51, pivotally connected at 52 and 53. Rock-shaft 17 is suitably supported substantially at right angles to shaft D and adjacent to lever 18. On rock-shaft 17 at a point beyond the fulcrum 40 of lever 18 is an arm 23, adapted to thrust lever 18 against collar 47 and unlock the clutch.

Hand-lever F, operating shaft 19 to rock arm 12, and thus shift the gear connections or rod H, comprises a hand-grasp 30, hand-grasp spring s, rod 31, catch d, springs s', and ratchet e for locking the gear-shifting mechanism in the desired position. In order to tie the gear-shifting mechanism to the clutch mechanism so that the former cannot be operated without unlocking the clutch C, I provide a rod, rock-arm and link connections between lever F and rock-shaft 36 comprising rock member 26 on lever F, secured to link 27 at 32, which, in turn, is pivoted to one end of rod 25 at 33, at the other end of which is pivoted at 34 one end of a rock-arm 35, rigidly secured to shaft 36. Rod 25 may extend across the machine in any convenient manner, though to obtain a compact construction I prefer to make shaft 19 hollow and carry rod 25 through it to arm 35, as shown in the drawings.

The operation of my device is as follows: When it is desired to release the clutch without changing gears, the foot of the operator is placed upon the pedal-lever E, causing the lever to turn upon shaft 19 as a fulcrum, thereby rocking rock-shaft 17 and causing arm 23 to contact with lever 18 and force the lever 18 against collar 47, moving the shaft D forward and disengaging member 11 from the fly-wheel member 10. In this position the piston 49 in dash-pot G is drawn out to the forward end thereof. The clutch may be thus held unlocked until the foot of the operator is removed from the pedal E. It will be understood that there is sufficient play in the pivots and pins 44 and 45 to permit member M in the above-described operation to pass over the spirals without engaging the worm. When the foot is removed from the pedal of lever E, the tension of spring 13 within the clutch C forces the inner member 11 to interlock with the member 10. The tension of this spring, however, is opposed and yieldingly resisted by the compressed air in dash-pot G, which supports lever 18 in this withdrawing movement, and through collar 47 causes the action of the spring 13 to be elastically cushioned, thus insuring gradual locking of the two clutch members without shock or strain. In shifting the gears by means of the hand-lever F, which operates the rod H, the clutch is automatically unlocked. This operation is accomplished through the link, rod, and rock-arm connections 23, 25, and 35, which rock the shaft 36 and lift roller r into engagement with the rear or left-hand spiral, Fig. 1, of worm 14. This worm being constantly rotating causes the spiral to engage the roller r and move the same, drawing with it, by means of the connection 43, the lever 18, which then bears against the collar 47 and thrusts the shaft D forward to unlock the clutch members. As soon as the last or right-hand spiral, as shown in Fig. 1, is reached by the roller r it passes on the outside or right-hand surface, Fig. 1, of the pivoted tongue t, which forms a collar. In this position the clutch is held unlocked, the lever 18 and the collar end of the worm 14 maintaining the shaft D in this position. It will be noted that by pivoting lever 18 at the end 40 and providing a point-bearing on loop 46 that the relative distance between point 40 and roller r may be increased and decreased, according as the angle between 18 and 43 is increased or decreased. To lock the clutch after the parts have assumed this position, it is merely necessary to drop or tilt the member M to release roller r from the collar or worm 14. This is done by rocking the shaft 36 in the opposite direction by means of lever F, connecting-rod 25, arm 35, and link 23.

It will be understood that I do not limit myself to the above-described details of construction or to the application of my device to automobiles solely, as many changes in construction and arrangement will suggest themselves to those skilled in the art, but

What I claim as my invention is—

1. In combination with a clutch adapted alternately to lock and rotatably connect and to unlock and disconnect independent shafts, and means for locking said clutch, a shifting-rod and means adapted to automatically and simultaneously unlock said clutch and operate said rod.

2. In combination with independent shafts, a clutch adapted alternately to lock and rotatably connect and to unlock and disconnect said shafts, and means for locking said clutch, a cross-lever and connections adapted to unlock said clutch, means for operating said cross-lever and connections, a shifting member, means adapted to operate the same alternately independently and simultaneously with said cross-lever and connections and a dash-pot and piston connected to said cross-lever adapted to yieldingly resist the locking of said clutch.

3. In combination with two rotating independent shafts in axial alinement a clutch member on each shaft adapted alternately to lock and rotatably connect and unlock and disconnect said shafts, one of said shafts being adapted to slide longitudinally in its bearings to lock and unlock said members, a spring adapted to maintain said members in locked position, a collar on said slidable shaft, a lever adapted to press against said collar to thrust said shaft longitudinally in its bearings, retract said spring and unlock said clutch, a shifting member, and means adapted to operate said shifting member and lever simultaneously.

4. In combination with a clutch C, longitudinally-slidable drive-shaft D, a stationary shaft B, a cross-lever provided intermediate of its ends with a loop embracing said drive-shaft, a collar on said drive-shaft adapted to contact with said lever, said lever being fulcrumed and supported at one end, a shifting member having operative connections with said lever, and means for shifting said member and simultaneously thrusting said lever against said collar to unlock said clutch, substantially as described.

5. In combination with the shifting member H, the clutch C, longitudinally-slidable drive-shaft D, a stationary shaft B, a lever disposed at an angle to the axis of said drive-shaft, a collar on said drive-shaft adapted to contact with said lever, said lever being fulcrumed and supported at one end, and means for simultaneously shifting said member and thrusting said lever against said collar to unlock said clutch, for the purposes described.

6. In combination with a lever and shifting-rod, a longitudinally-slidable driving-shaft adapted alternately to lock and unlock a clutch, a clutch adapted alternately to connect and disconnect said drive-shaft to a power-shaft, means for locking said clutch, means for unlocking said clutch independently of said lever, and means for automatically unlocking said clutch whenever said lever and connections are changed or shifted.

7. In combination with a lever and shifting-rod, a longitudinally-slidable driving-shaft adapted alternately to lock and unlock a clutch, a clutch adapted alternately to connect and disconnect said drive-shaft to a power-shaft, means for locking said clutch, means for unlocking said clutch independently of said lever, means for automatically unlocking said clutch whenever said lever and rod are shifted, and means for cushioning said clutch-locking means.

In testimony whereof I hereunto affix my signature in presence of two witnesses.

CHARLES A. NOREN.

Witnesses:
CHARLES L. HINE,
ARTHUR PREENE.